(12) United States Patent
Nagasawa et al.

(10) Patent No.: US 6,874,045 B2
(45) Date of Patent: Mar. 29, 2005

(54) DIGITAL SIGNAL PROCESSING APPARATUS AND PROCESSING METHOD, AND DIGITAL SIGNAL REPRODUCTION/RECEPTION SYSTEM

(75) Inventors: Hiroshi Nagasawa, Tokyo (JP); Kenji Shiba, Tokyo (JP); Tetsuya Aoki, Tokyo (JP)

(73) Assignee: Sony Corporation, Tokyo (JP)

( * ) Notice: Subject to any disclaimer, the term of this patent is extended or adjusted under 35 U.S.C. 154(b) by 148 days.

(21) Appl. No.: 10/344,197
(22) PCT Filed: Jun. 19, 2002
(86) PCT No.: PCT/JP02/06120
   § 371 (c)(1),
   (2), (4) Date: Feb. 7, 2003
(87) PCT Pub. No.: WO03/001510
   PCT Pub. Date: Jan. 3, 2003

(65) Prior Publication Data
   US 2003/0176936 A1 Sep. 18, 2003

(30) Foreign Application Priority Data
   Jun. 21, 2001 (JP) .................................. 2001-188647

(51) Int. Cl.⁷ .................... H04B 14/04; G10L 21/02
(52) U.S. Cl. .................... 710/69; 375/254; 375/247; 704/226
(58) Field of Search .................... 710/65.62, 72, 710/69; 341/143, 144; 375/242, 247, 254; 704/212, 226

(56) References Cited

U.S. PATENT DOCUMENTS

| | | | | |
|---|---|---|---|---|
| 4,490,838 A | * | 12/1984 | Nishioka et al. | 381/15 |
| 5,809,454 A | * | 9/1998 | Okada et al. | 704/214 |
| 5,889,483 A | * | 3/1999 | Tagami et al. | 341/143 |
| 6,628,720 B1 | * | 9/2003 | Sekii | 375/247 |
| 2002/0025010 A1 | * | 2/2002 | Yamazaki | 375/342 |

* cited by examiner

Primary Examiner—Kim Huynh
(74) Attorney, Agent, or Firm—Jay H. Maioli

(57) ABSTRACT

A digital signal processor receives 1-bit audio signals acquired by sigma modulation and sent over a predetermined transmission line and makes a changeover between the audio signal and a mute pattern includes an IEEE 1394 interface. The IEEE 1394 interface receives an isochronous packet sent over an IEEE 1394-formatted transmission line, extracts music data from the packet, supplies the music data to a DRAM, monitors the amount of data stored in the DRAM, reads a 1-bit digital signal or generates a mute pattern such as a 9-6 pattern, and makes a changeover between the 1-bit digital signal read from the DRAM and mute pattern while fading them. The digital signal processor further includes a D-A converter to convert the 1-bit digital signal supplied from the IEEE 1394 interface into an analog signal.

11 Claims, 8 Drawing Sheets

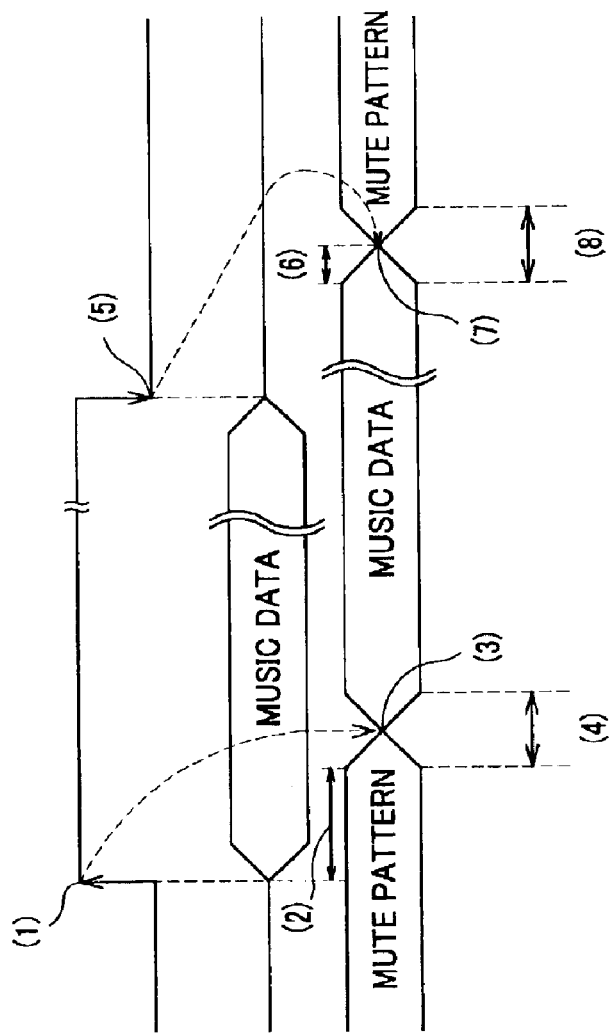

DIGITAL SIGNAL PROCESSING APPARATUS AND PROCESSING METHOD, AND DIGITAL SIGNAL REPRODUCTION/RECEPTION SYSTEM

TECHNICAL FIELD

The present invention generally relates to a digital signal processing apparatus and method, and more particularly to a digital signal processing apparatus for, and a digital signal processing method of, receiving a 1-bit audio signal acquired by the delta-sigma modulation and sent over a predetermined transmission line and making a changeover of the 1-bit audio signal to a mute pattern, and also to a digital signal playing/reception system composed of a digital signal player and digital signal receiver connected to each other over the predetermined transmission line.

BACKGROUND ART

Conventionally, there is widely used a compact disc (CD) in which the sampling frequency fs is about 44.1 kHz and the PCM method is used to record one sample as 16-bit digital audio data for each channel. There has been proposed a so-called super audio compact disc (SACD) in which 1-bit audio stream data is recorded with a very high sampling frequency generated by the DSD (direct stream digital) method, for example, a frequency 64 times higher than the sampling frequency fs in the ordinary CD.

By oversampling delta-sigma modulation of an input signal with 64fs, there is generated a 1-bit audio digital signal. Hereupon, the 1-bit audio digital signal is decimated into a multi-bit PCM code in the CD using the PCM method. In the SACD using the DSD method, however, the 1-bit audio digital signal is recorded directly to the SACD.

The frequency band of the 1-bit audio signal recorded to the SACD is about 100 kHz. This is rather wider than the frequency band of the signal in the PCM method adopted in the CD.

In the PCM method, one sample is taken as 16-bit digital audio data for each channel, such as digital audio data defined in IEC 60958 or the like. In such digital audio data, "0" data is used as a signal indicating a muting.

On the other hand, the 1-bit audio signal in the DSD method uses a special mute pattern data called so-called "9-6 pattern" of "10010110" as a signal indicative of a muting. When music data is changed over to a 9-6 pattern or vice versa, a noise will possible occur unless the music data and 9-6 pattern are put in phase with each other at the changeover point.

In a system including a medium player and amplifier in combination, muting can be applied at the signal changeover point inside the system by detecting a trigger for a signal changeover, for example, an operation for play by the user.

In a system including separate unit components such as 1-bit audio signal player and amplifier, a trigger generated in the player cannot be detected at the amplifier and thus the amplifier cannot apply muting at any signal changeover point. That is, the amplifier converts a signal sent from the player into an analog signal and delivers it as it is without applying any muting at the point of changeover point between a muting (9-6 pattern) and music data. If the muting and music data are out of phase at the changeover point, a noise, if any, will be delivered as it is. Therefore, the noise will possibly be heard at the start of playing a signal and during shift from the signal playing to stop of the playing.

DISCLOSURE OF THE INVENTION

Accordingly, the present invention has an object to overcome the above-mentioned drawbacks of the related art by providing a digital signal processing apparatus and method, capable of predicting a point of changeover between music data and mute pattern and preventing noise from occurring at the start of playing a DSD music signal and during shift from the signal playing to stop of the playing, independently of any player.

The present invention has another object to provide a digital signal playing/reception system having a digital signal processor in a receiver section.

The above object can be attained by overcoming the above-mentioned drawbacks of the related art by providing a digital signal processor including according to the present invention:

a reception means for receiving a 1-bit audio signal acquired by the delta-sigma modulation and sent over a predetermined transmission line;

a memory means for temporarily storing the 1-bit audio signal received by the reception means;

a monitoring means for monitoring the amount of data stored in the memory means based on relations between the data amount in the memory means and some predetermined values;

a mute signal generating means for generating a 1-bit digital signal indicative of a mute signal;

a changeover means for making a changeover between the 1-bit audio signal read from the memory means and the 1-bit digital signal indicating the mute signal and received from the mute signal generating means;

a D-A conversion means for converting the 1-bit digital signal supplied from the changeover means into an analog signal; and a control means for making a changeover between the 1-bit digital signal indicating the mute signal and received from the mute signal generating means and 1-bit audio signal read from the memory means based on the relations between the data amount in the memory means and some predetermined values and monitored by the monitoring means and supplying the signal thus selected to the D-A conversion means.

The above digital signal processor further includes a signal processing means for fading the 1-bit audio signal read from the memory means and the mute signal supplied from the mute signal generating means.

In the above digital signal processor according to the present invention, when the monitoring means detects that the data amount in the memory means has gradually increased from zero and reached a value larger than a first predetermined value P1, the control means causes the changeover means to change the 1-bit digital signal indicating the mute signal and received from the mute signal generating means over to the 1-bit audio signal read from the memory means while fading them by means of the signal processing means.

In this digital signal processor according to the present invention, when the monitoring means detects that the data amount in the memory means has gradually changed toward zero and reached a value smaller than a second predetermined value P2, the control means causes the changeover means to change the 1-bit audio signal read from the memory means over to the 1-bit digital signal indicating the mute signal and received from the mute signal generating means while fading it by means of the signal processing means.

Also the above object can be attained by providing a digital signal processing method including, according to the present invention, steps of:

receiving a 1-bit audio signal acquired by the delta-sigma modulation and sent over a predetermined transmission line;

monitoring relations between the amount of data temporarily stored in a memory means for temporarily storing the 1-bit audio signal received in the reception step and some predetermined values;

generating a 1-bit digital signal indicative of a mute signal;

making a changeover between the 1-bit audio signal read from the memory means and the 1-bit digital signal indicative of the mute signal supplied from the mute signal generating step; and making D-A conversion of the 1-bit digital signal supplied from the changeover step into an analog signal;

a changeover being made between the 1-bit digital signal indicating the mute signal supplied from the mute signal generating step and 1-bit audio signal read from the memory means based on the relations between the data amount in the memory means and some predetermined values, and the selected signal being supplied to the D-A conversion step.

The above digital signal processing method further includes a step of fading the 1-bit audio signal read from the memory means and the mute signal supplied from the mute signal generating means.

Also the above object can be attained by providing a digital signal playing/reception system including according to the present invention:

a digital signal player for playing a 1-bit digital signal acquired by the delta-sigma modulation; and a digital signal receiver for receiving the 1-bit digital signal played by the digital signal player over a predetermined transmission line;

the digital signal receiver including:

a reception means for receiving the 1-bit audio signal sent over the predetermined transmission line;

a memory means for temporarily storing the 1-bit audio signal received by the reception means;

a monitoring means for monitoring the amount of data stored in the memory means based on relations between the data amount in the memory means and some predetermined values;

a mute signal generating means for generating a 1-bit digital signal indicative of a mute signal;

a changeover means for making a changeover between the 1-bit audio signal read from the memory means and the 1-bit digital signal indicating the mute signal and received from the mute signal generating means;

a D-A conversion means for converting the 1-bit digital signal supplied from the changeover means into an analog signal; and a control means for making a changeover between the 1-bit digital signal indicating the mute signal and received from the mute signal generating means and 1-bit audio signal read from the memory means based on the relations between the data amount in the memory means and some predetermined values and monitored by the monitoring means and supplying the signal thus selected to the D-A conversion means.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIGS. 8A to 8C are timing charts for explanation of the operations of the audio receiver.

BEST MODE FOR CARRYING OUT THE INVENTION

In the following, there will be described by way of example an audio system which receives, by an audio receiver in which the digital signal processing apparatus and method according to the present invention, a 1-bit digital audio signal acquired by the delta-sigma modulation and sent from an audio player, converts the 1-bit audio signal into an analog signal, and delivers the audio wave at a speaker.

The audio system is an embodiment of the digital signal playing/reception system according to the present invention.

Figure 1:
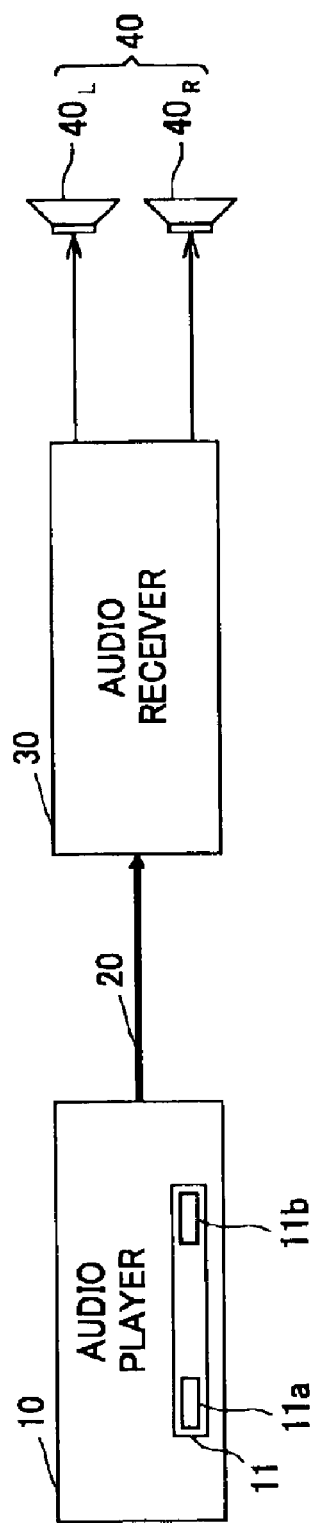
FIG. 1 is a block diagram of an audio system according to the present invention.

As shown in FIG. 1, the audio system in which the digital signal playing/reception system according to the present invention is applied includes an audio player 10 to play a 1-bit audio signal acquired by the delta-sigma modulation, and an audio receiver 30 to receive the 1-bit audio signal played by the audio player 10 over a transmission line 20 conforming to the IEEE 1394 format.

The audio player 10 reads a 1-bit audio signal from a super audio compact disc (SACD) having 1-bit audio stream data produced by the direct stream digital (DSD) method recorded therein with a very high sampling frequency, for example, a frequency 64 times higher than a sampling frequency fs for an ordinary CD.

Figure 2:
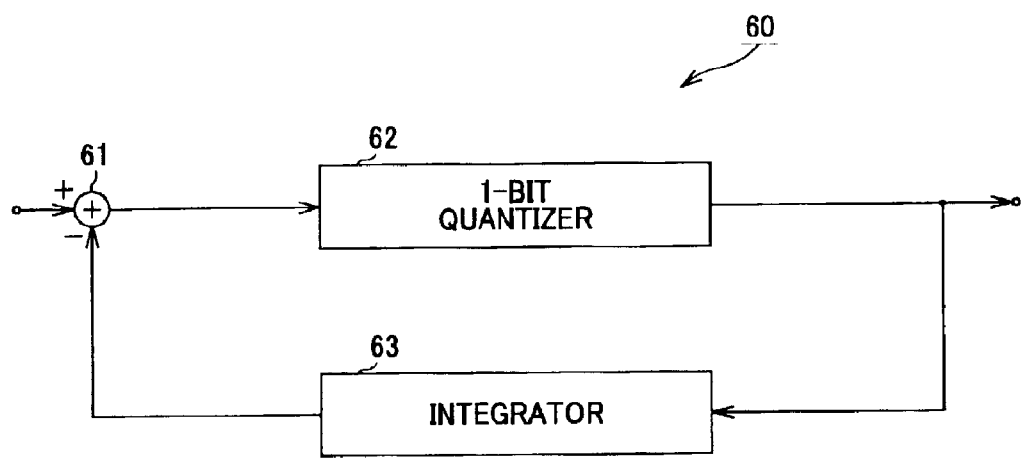
FIG. 2 is a block diagram of the delta-sigma modulator, showing the principle of the latter.

The 1-bit audio signal is produced by a delta-sigma modulator 60 constructed as shown in FIG. 2. The delta-sigma modulator 60 includes an adder 61, 1-bit quantizer 62 and an integrator 63. In the delta-sigma modulator 60, a difference (delta: $\Delta$) between an analog input signal and an integral value of 1-bit output signals (sigma: $\Sigma$) is determined by the adder 61 and supplied to the 1-bit quantizer 62. The output signal consists of bits of logical zeroes (0) and logical ones (1), representing −1 and +1, respectively, as actual values. The integrator 63 accumulates 1-bit output signals and provides an accumulated value which follows up with the value of the analog input signal. Each time the 1-bit quantizer 62 generates one bit, it increase or decreases the accumulated value by one. The sampling frequency is so high as to generate a string of output bits whose accumulated value will follow up the analog input signal. The sampling frequency is 64fs (64 times higher than fs (=44.1 kHz), for example. The 64fs, namely, 1-bit digital audio signal supplied from the $\Delta$-$\Sigma$ modulator, is recorded in the SACD as above.

Figure 3:
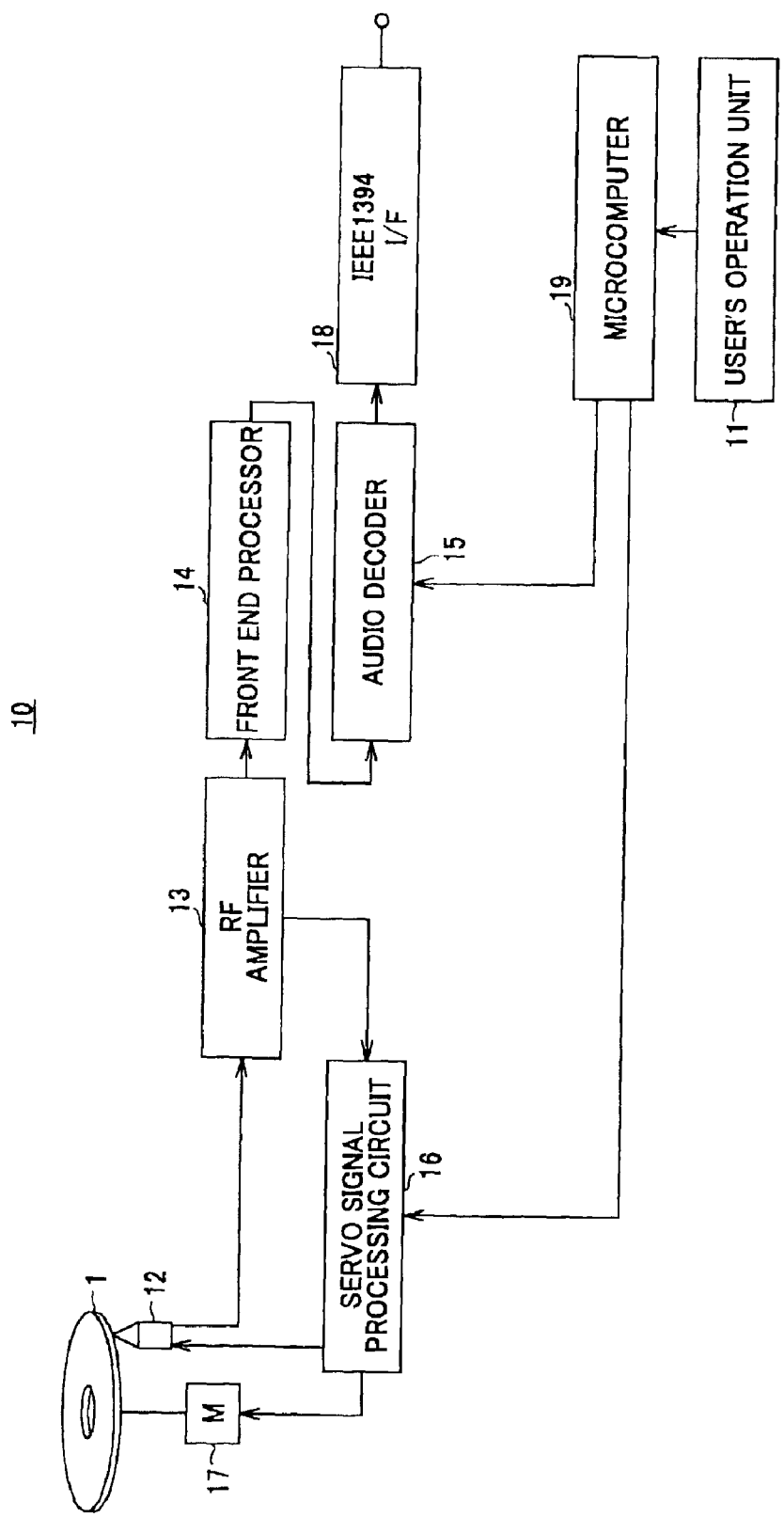
FIG. 3 is a block diagram of an audio player included in the audio system shown in FIG. 1.

The audio player 10 is constructed as shown in FIG. 3. In the audio player 10, a SACD 1 is rotated by a spindle motor 17 at a constant linear velocity (CLV), for example. A read laser light is projected from an optical pickup 12 to the SACD 1 being rotated. A photodetector in the optical pickup 12 detects a return laser light from the SACD 1 to read a signal related to a 1-bit audio signal recorded in the SACD 1. The read signal is supplied to an RF amplifier 13. An RF signal output from the RF amplifier 13 is supplied to a front end processor 14.

The front end processor 14 demodulates, corrects any error of, the RF signal to generate sector data having a fixed length of 2064 bytes, for example, and supply it to an audio decoder 15 provided downstream thereof. The audio decoder 15 receives the sector data having the fixed length of 2064 bytes byte by byte from the front end processor 14, analyzes an audio_header at the beginning of each sector and records the data in units of a 1/75-sec frame into each block of an internal or external memory. The data recorded in units of a frame in each block of the internal or external memory is decoded by a compression decoder (not shown) provided in the audio decoder 15 and then supplied to an IEEE 1394 interface 18.

After a play key which will be described in detail later is pressed by the user, the IEEE 1394 interface 18 acquires a predetermined number of 1-bit audio signals from the audio decoder 15 along with auxiliary data, for example, at every other 24 bits to form an isochronous packet including music data, and supply the isochronous packets to an IEEE 1394-formatted transmission line 20 at regular intervals. Even when the audio player 10 is stopped from playing signals by the user pressing a stop key which will be described in detail later, the IEEE 1394 interface 18 will supply empty isochronous packets (namely, isochronous packets each including no music data) to the IEEE 1394-formatted transmission line 20. Thus, the IEEE 1394 interface 18 may be said to be a transmission processor, namely, an IEEE 1394 transmission processor, destined for transmission of such packets over the IEEE 1394-formatted transmission line 20.

The data transmission at every other 32 bits is basic to the data transmission conforming to the IEEE 1394 format. In the AM 824, the first 8 bits form together a label which is predetermined for each application and may not be supplied from the audio decoder 15 o the IEEE 1394 interface 18. Also, 24 bits form together one unit of the auxiliary data.

Note that the 1-bit audio signal supplied from the audio decoder 15 is converted by a D-A converter (not shown) in the audio player 10 itself into an analog audio signal, and may be supplied to an external amplifier, speaker and the like via an output terminal.

The RF amplifier 13 produces a tracking error signal and focus error signal as well from the read signal and supplies them to a servo signal processing circuit 16. The servo signal processing circuit 16 drives an actuator which moves an objective lens of the optical pickup 12 based on the tracking and focus error signals supplied from the RF amplifier 13 to control the read laser light focused through the objective lens on the SACD 1 in following a recording track on the SACD 1. The servo signal processing circuit 16 controls the spindle motor 17 also.

The audio decoder 15, servo signal processing circuit 16 and the like are operated under the control of a microcomputer 19. The microcomputer 10 has connected thereto a user's operation unit 11 having at least a play key 11a and stop key 11b provided thereon.

Figure 4:
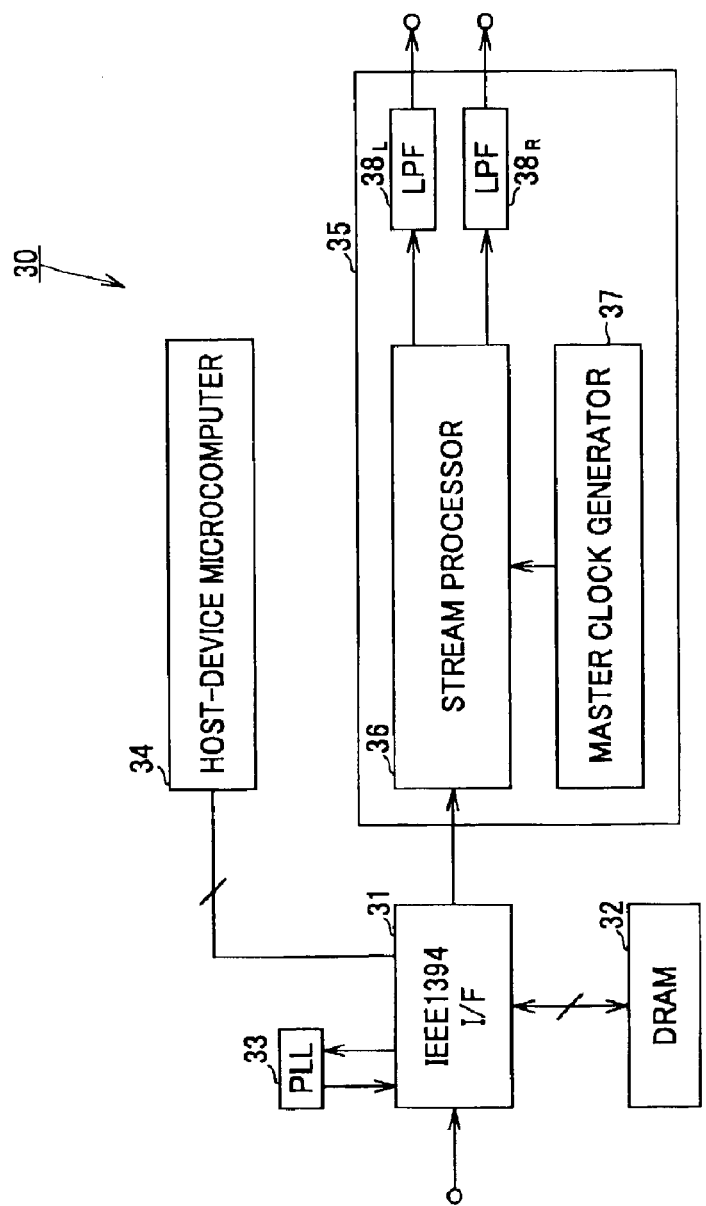
FIG. 4 is a block diagram of an audio receiver included in the audio system shown in FIG. 1.

The audio receiver 30 is constructed as shown in FIG. 4.

As shown in FIG. 4, the audio receiver 30 includes an IEEE 1394 interface 31 which receives an isochronous packet sent over the IEEE 1394-formatted transmission line 20, extracts a 1-bit digital signal being music data from the isochronous packet and supplies the data to a dynamic random access memory (DRAM) 32 which will be described in detail later, while monitoring the amount of data stored in the DRAM 32, reading a 1-bit digital signal from the DRAM 32 or generating a mute pattern like a 9-6 pattern and making a changeover between the 1-bit digital signal read from the DRAM 32 and mute pattern with fading them. The IEEE 1394 interface 31 has a PLL circuit 33 connected thereto, a D-A converter 35 to convert the 1-bit digital signal supplied from the IEEE 1394 interface 31 into an analog signal, and a host-side microcomputer 34 which controls the operation of the IEEE 1394 interface 31. The IEEE 1394 interface 31 has a PLL circuit 33 connected thereto.

The D-A converter 35 includes a stream processor 36 to extract L- and R-channel 1-bit stereo audio signals from a data stream based on a master clock supplied from a master clock generator 37 and convert them into PWM signals, and an LPF 38L and LPF 38R to convert the stereo PWM signals L and R thus acquired into L- and R-channel analog signals, respectively, and deliver them.

The audio receiver 30 constructed as shown in FIG. 4 functions as will be described below:

The isochronous packet sent from the audio player 10 over the IEEE 1394-formatted transmission line 20 is received by the IEEE 1394 interface 31 which will extract a 1-bit digital signal being music data from the packet and temporarily store (buffer) it once in the DRAM 32. When the IEEE 1394 interface 31 has received any empty packet, nothing will be stored into the DRAM 32 since the packet has no data part.

When the amount of 1-bit audio signals stored in the DRAM 32 exceeds a specific value, the IEEE 1394 interface 31 will start read the data from the DRAM 32. The data amount at which the data read is to be started is set the host-side microcomputer 34 for the IEEE 1394 interface 31.

The IEEE 1394 interface 31 supplies a 1-bit digital signal read from the DRAM 32 to the stream processor 36 provided in the D-A converter 35. The stream processor 36 converts the 1-bit audio signals into PWM signals, and then sends them to the LPFs 38L and 38R. The LPFs 38L and 38R convert the PWM signals into analog signals and deliver them.

Figure 5:
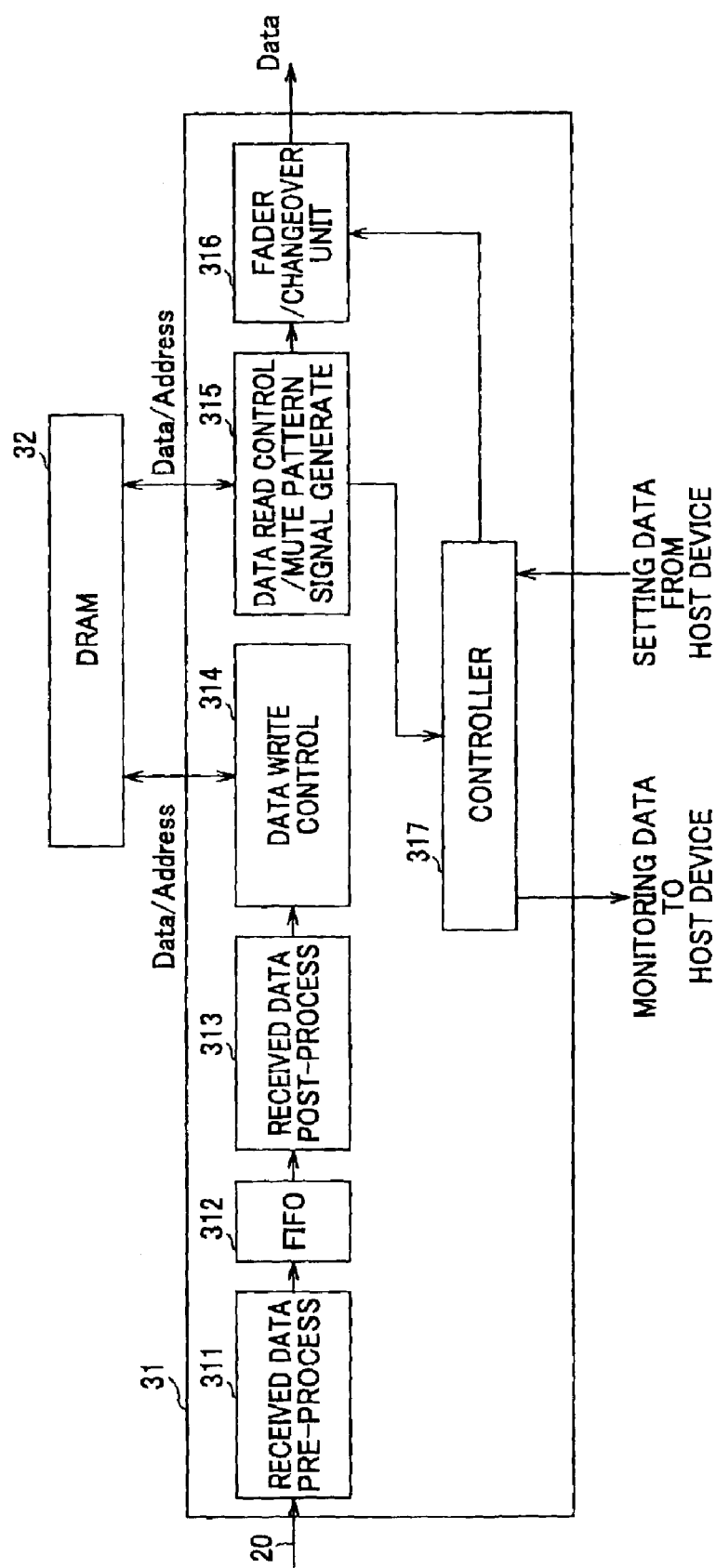
FIG. 5 is a block diagram of the IEEE 1394 interface as an essential part of the audio receiver shown in FIG. 4.

FIG. 5 shows in detail the construction of the IEEE 1394 interface 31. As shown in FIG. 5, the IEEE 1394 interface 31 includes a received data pre-processor 311 which receives an isochronous packet sent over the IEEE 1394-formatted transmission line 20, an FIFO 312 to store the isochronous packet supplied from the received data pre-processor 311, a received data post-processor 313 to read data from the FIFO 312 in units of a packet, a data write control unit 314 to control data write to the DRAM 32, a data read control/mute pattern generation unit 315 to control data read from the DRAM 32 and generate a mute pattern, a fader/changeover unit 316 to make a changeover between the 1-bit audio signal and mute pattern while fading them, and a controller 317 having a group of registers for various monitor signals and SW for interfacing with the host-side microcomputer 34.

The IEEE 1394 interface 31 constructed as having been described above with reference to FIG. 5 functions as will be described below:

A packet data from the received data pre-processor 313 to read data from the FIFO 312 in units of a packet is supplied to the data write control unit 314 which will generate an address for write to the DRAM 32 and write the data to the latter.

The data read control/mute pattern generation unit 315 reads data from the DRAM 32, generates a mute pattern and compares it with the write address, to thereby calculate the amount of data stored in the DRAM 32. Thereby, the data read control/mute pattern generation unit 315 can monitor the amount of data cumulatively stored in the DRAM 32. When the data amount exceeds a first predetermined value P1 set by the host-side microcomputer 34, the data read control/mute pattern generation unit 315 starts reading data from the DRAM 32. When the DRAM 32 has become empty, the data read control/mute pattern generation unit 315 stops reading data from the DRAM 32 and outputs the 9-6 pattern.

Figure 6:
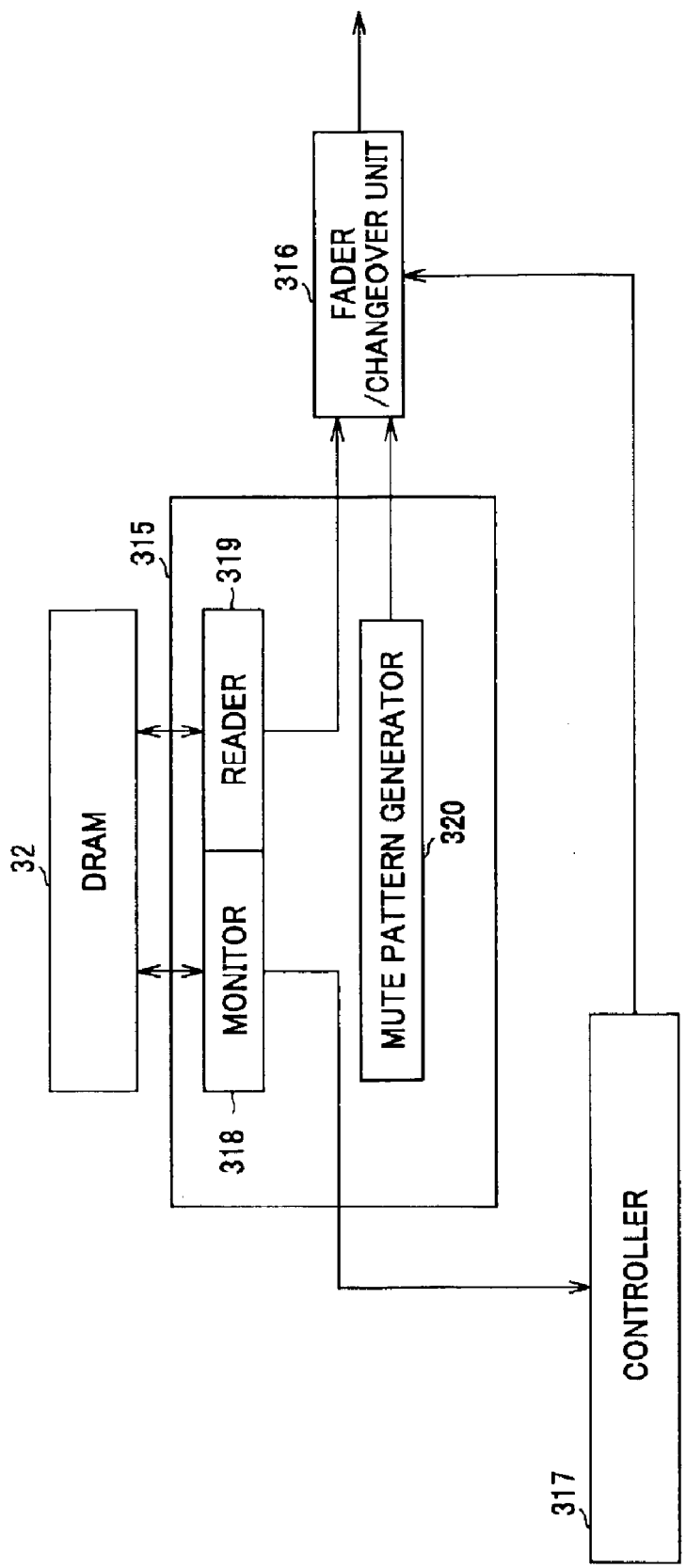
FIG. 6 is a block diagram of a data read control/mute signal generation unit as an essential part of the IEEE 1394 interface.

The construction of the data read control/mute pattern generation unit 315 is shown in detail in FIG. 6. As shown, the data read control/mute pattern generation unit 315 includes a monitor 318 to monitor the amount of data stored in the DRAM 32 based on relations between the data amount in the DRAM 32 and the first predetermined value P1 and a second predetermined value P2 which will be described in detail later, a reader 319 to read data from the DRAM 32, and a mute pattern generator 320 to generate a mute pattern like the 9-6 pattern.

The monitor 318 calculates the amount of data in the DRAM 32 by comparing an address in the DRAM 32 from which the reader 319 reads data with an address where data is written, and monitors the data amount in the DRAM 32.

Figure 7:
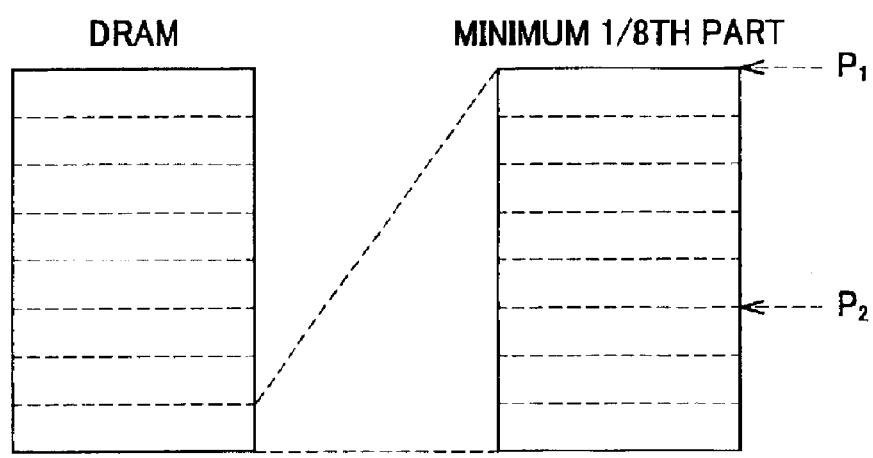
FIG. 7 schematically illustrates DRAM.

The image of monitoring of the data amount in the DRAM 32 will be explained below with reference to FIG. 7. The DRAM 32 can be divided into eight parts and each of the eight divisions (minimum ⅛th part) be further divided into eight parts for monitoring the data amount, and setting a read start point P1 being the first predetermined value and a lower limit P2 being the second predetermined value, in each of the ⅛th parts of the DRAM 32 and also in each of the 1/64th sub-parts. That is, the data amount can be monitored and set in each of the 0/64th to 8/64th (=⅛th) sub-parts and in each of the ⅛th to ⅞th parts.

The first predetermined value P1 is set in the registers of the controller 317 by the host-side microcomputer 34. Also the second predetermined value P2 is set in the registers of the controller 317 by the host-side microcomputer 34. There is established a relation that P1>P2 between the read start point P1 being the first predetermined value and the lower limit P2 being the second predetermined value. More specifically, the lower limit P2 should desirably be approximate to zero as long as the apparatus performance allows it.

The audio receiver 30 included in the audio system according to the present invention functions, as will be described in detail below with reference to FIG. 8, when the audio player 10 is in stop state, when the audio player 10 starts playing from the stop state and when the audio player 10 stops playing, respectively.

FIG. 8 is a timing chart indicating relations between the operations of the audio player 10 by the user, data write to the DRAM and timing of output from the fader.

First, when the audio player is in stop stats, for example, immediately after the audio receiver 30 has selected the audio player 10 as a designation of a signal and when the audio player 10 has not yet start playing the signal, the audio player 10 outputs the aforementioned empty isochronous packet and sends it to the audio receiver 30 over the IEEE 1394-formatted transmission line 20.

At this time, the IEEE 1394 interface 31 of the audio receiver 30 receives the isochronous packet by means of the received data pre-processor 311 thereof as having previously been described with reference to FIG. 5, stores it into the FIFO 312, and reads the data in units of a packet by means of the received data post-processor 313. Since the isochronous packets are empty in this case, no data is cumulated in the DRAM 32, the data read control/mute pattern generation unit 315 in the IEEE 1394 interface 31 generates a mute pattern like the 9-6 pattern and supplies it to the D-A converter 35 via the fader/changeover unit 316. The D-A converter 35 converts the mute pattern into an analog signal and outputs the mute signal. Therefore, nothing will be heard as any sound wave from the speaker.

Next, the operation of the audio receiver 30 when the audio player 10 starts playing from the above stop state will be described. When the play key 11a on the user's operation unit 11 of the audio player 10 is operated at a time point (1) in FIG. 8A, the audio player 10 will read 1-bit audio signals from the SACD 1, form the 1-bit audio signals into an isochronous packet, and deliver such isochronous packets at regular intervals. The isochronous packets each including the 1-bit audio signals are sent to the IEEE 1394 interface 31 over the IEEE 1394-formatted transmission line 20.

At this time, the IEEE 1394 interface 31 of the audio receiver 30 receives the isochronous packets each including the 1-bit audio signals by means of received data pre-processor 311, stores them into the FIFO 312 and reads the data in units of a packet by means of the received data post-processor 313, as shown in FIG. 5. Under the control of data write by the data write control unit 314, the 1-bit audio signals are written to the DRAM 32 and music data are stored in the DRAM 32, as shown in FIG. 8B.

When the monitor 318 included in the data read control/mute pattern generator 315 detects that the stored music data has become larger than the read start point P1 preset in the register of the controller 317 by the host-side microprocessor 34, the data read control/mute pattern generation unit 315 will request the fader/changeover unit 316 for turning on the fader (fade-in) and then read the music data from the DRAM 32 by means of the reader 319. Thus, the fader/changeover unit 316 makes a fade-in at the time of changeover from the mute pattern to the music data (time point (3) in FIG. 8C), thereby preventing a noise from occurring.

A length of time (2) shown in FIG. 8C is taken from the start of music data storage into the DRAM 32 until the read start point P1. Also, a length of time (4) in FIG. 8C is required for the fade-in operation.

Next, the operation of the audio receiver 30 when the audio player 10 stops from playing will be described. When the stop key 11b on the user's operation unit 11 of the audio player 10 is operated at a time point (5) shown in FIG. 8A to stop the audio player 10 from playing, the latter will output the aforementioned empty isochronous packets and send them to the audio receiver 30 over the IEEE 1394-formatted transmission line 20.

At this time, the IEEE 1394 interface 31 of the audio receiver 30 will receive the isochronous packets by means of the received data pre-processor 311, store them into the FIFO 312 and read the data in units of a packet by means of the received data post-processor 313, as shown in FIG. 5. Since the isochronous packets are empty in this case, no data will be stored into the DRAM 32 while the data amount in the latter will be smaller.

When the monitor 318 included in the data read control/mute pattern generation unit 315 detects that the data amount has become smaller than the lower limit P2 preset in the registers of the controller 317 by the host-side microprocessor 34, the data read control/mute pattern generation unit 315 will request the fader/changeover unit 316 for turning off the fader (fade-out). The DRAM 32 will be empty, and at a time point (7) in FIG. 8C of changeover from the music data over to the mute pattern, the fader/changeover unit 316 will make a fade-out, thereby preventing a noise from occurring.

A time length (6) in FIG. 8C is taken after the music data in the DRAM 32 has become smaller than the aforementioned lower limit P2 and the DRAM 32 has thus become empty until changeover to the mute data. A time length (8) in FIG. 8C is taken for the fade-out operation.

As having been described in the foregoing, the audio receiver 30 in the audio system according to the present invention predicts a point of changeover between music data and mute pattern based on the amount of data buffered in the DRAM 32 to make fade-in or fade-out, thereby preventing a noise from taking place at the start of playing DSD music signals and at the stop of playing.

Industrial Applicability

The digital signal processing apparatus and method according to the present invention can predict a point of changeover between music data and mute pattern to prevent noise from occurring at the start of playing a music signal and during shift from the signal playing to stop of the playing, independently of any player.

The digital signal playing/reception system according to the present invention can predict a point of changeover between music data and mute pattern to prevent noise from occurring at the start of playing a DSD music signal and during shift from the signal playing to stop of the playing, independently of any player.

What is claimed is:

1. A digital signal processor comprising:
   reception means for receiving 1-bit audio signals acquired by delta-sigma modulation and sent over a transmission line;
   memory means for temporarily storing the 1-bit audio signals received by the reception means;
   monitoring means for monitoring an amount of data stored in the memory means based on relations between a data amount in the memory means and predetermined values;
   mute signal generating means for generating a 1-bit digital signal indicative of a mute signal;
   changeover means for making a changeover between the 1-bit audio signals read from the memory means and the 1-bit digital signal indicating the mute signal received from the mute signal generating means;
   D-A conversion means for converting the 1-bit digital signal supplied from the changeover means into an analog signal; and
   control means for making a changeover between the 1-bit digital signal indicating the mute signal received from the mute signal generating means and 1-bit audio signals read from the memory means based on the relations between the data amount in the memory means and the predetermined values and monitored by the monitoring means and supplying the signal having been changed over to the D-A conversion means.

2. The apparatus as set forth in claim 1, further comprising signal processing means for fading the 1-bit audio signals read from the memory means and the mute signal supplied from the mute signal generating means.

3. The apparatus as set forth in claim 2, wherein when the monitoring means detects that the data amount in the memory means has gradually increased from zero and reached a value larger than a predetermined value, the control means causes the changeover means to change the 1-bit digital signal indicating the mute signal and received from the mute signal generating means over to the 1-bit audio signals read from the memory means while fading it by means of the signal processing means.

4. The apparatus as set forth in claim 2, wherein when the monitoring means detects that the data amount in the memory means has gradually changed toward zero and reached a value smaller than a predetermined value, the control means causes the changeover means to change the 1-bit audio signals read from the memory means over to the 1-bit digital signal indicating the mute signal and received from the mute signal generating means while fading it by means of the signal processing means.

5. The apparatus as set forth in claim 1, wherein the transmission line conforms to the IEEE 1394 format.

6. A digital signal processing method comprising steps of:
   receiving 1-bit audio signals acquired by delta-sigma modulation and sent over a predetermined transmission line;
   monitoring relations between an amount of data temporarily stored in a memory for temporarily storing the 1-bit audio signals received in the reception step and predetermined values;
   generating a 1-bit digital signal indicative of a mute signal;
   performing a changeover between the 1-bit audio signals read from the memory and the 1-bit digital signal indicative of the mute signal supplied from the mute signal generating step; and
   making D-A conversion of the 1-bit digital signal supplied from the changeover step into an analog signal;
   a changeover being made between the 1-bit digital signal indicating the mute signal supplied from the mute signal generating step and 1-bit audio signals read from the memory based on the relations between a data amount in the memory and the predetermined values, and the changed over signal being supplied to the D-A conversion step.

7. The method as set forth in claim 6, further comprising a step of fading the 1-bit audio signals read from the memory means and the mute signal supplied from the mute signal generating step.

8. A digital signal playing/reception system comprising:
   a digital signal player for playing 1-bit digital signals acquired by delta-sigma modulation; and
   a digital signal receiver for receiving the 1-bit digital signal played by the digital signal player over a transmission line;
   the digital signal receiver including:
   reception means for receiving the 1-bit audio signals sent over the transmission line;
   memory means for temporarily storing the 1-bit audio signals received by the reception means;
   monitoring means for monitoring an amount of data stored in the memory means based on relations between a data amount in the memory means and predetermined values;
   mute signal generating means for generating a 1-bit digital signal indicative of a mute signal;
   changeover means for making a changeover between the 1-bit audio signals read from the memory means and the 1-bit digital signal indicating the mute signal received from the mute signal generating means;

D-A conversion means for converting the 1-bit digital signal supplied from the changeover means into an analog signal; and control means for making a changeover between the 1-bit digital signal indicating the mute signal and received from the mute signal generating means and 1-bit audio signals read from the memory means based on the relations between the data amount in the memory means and the predetermined values and monitored by the monitoring means and supplying a signal to the D-A conversion means.

9. The system as set forth in claim 8, wherein the digital signal receiver further includes signal processing means for fading the 1-bit audio signals read from the memory means and the mute signal supplied from the mute signal generating means.

10. The system as set forth in claim 9, wherein when the monitoring means detects that the data amount in the memory means has gradually increased from zero and reached a value larger than a predetermined value, the control means causes the changeover means to change the 1-bit digital signal indicating the mute signal and received from the mute signal generating means over to the 1-bit audio signals read from the memory means while fading it by means of the signal processing means.

11. The system as set forth in claim 9, wherein when the monitoring means detects that the data amount in the memory means has gradually changed toward zero and reached a value smaller than a predetermined value, the control means causes the changeover means to change the 1-bit audio signals read from the memory means over to the 1-bit digital signal indicating the mute signal and received from the mute signal generating means while fading it by means of the signal processing means.

* * * * *